(12) United States Patent
Cheng et al.

(10) Patent No.: US 9,444,084 B2
(45) Date of Patent: Sep. 13, 2016

(54) FLUOROPOLYMER COMPOSITIONS

(75) Inventors: Shujing Cheng, Shanghai (CN); Ann Mu, Shanghai (CN); Sophie Deroo, L'Hay les Roses (FR); Patrick Lasnet De Lanty, Fontenay-aux-Roses (FR)

(73) Assignees: SOLVAY (CHINA) CO., LTD., Shanghai (CN); Rhondia Operations, Aubervilliers (FR)

( * ) Notice: Subject to any disclaimer, the term of this patent is extended or adjusted under 35 U.S.C. 154(b) by 330 days.

(21) Appl. No.: 13/995,100

(22) PCT Filed: Dec. 14, 2011

(86) PCT No.: PCT/CN2011/083958
§ 371 (c)(1),
(2), (4) Date: Jun. 17, 2013

(87) PCT Pub. No.: WO2012/079506
PCT Pub. Date: Jun. 21, 2012

(65) Prior Publication Data
US 2013/0266723 A1    Oct. 10, 2013

Related U.S. Application Data

(63) Continuation of application No. PCT/CN2010/079830, filed on Dec. 15, 2010.

(51) Int. Cl.
| | | |
|---|---|---|
| C08K 5/41 | (2006.01) | |
| H01M 2/14 | (2006.01) | |
| C08K 5/11 | (2006.01) | |
| C09D 127/16 | (2006.01) | |
| B05D 3/00 | (2006.01) | |

(52) U.S. Cl.
CPC ............. *H01M 2/145* (2013.01); *B05D 3/007* (2013.01); *C08K 5/11* (2013.01); *C08K 5/41* (2013.01); *C09D 127/16* (2013.01)

(58) Field of Classification Search
USPC .......................................... 524/173; 427/58
See application file for complete search history.

(56) References Cited

U.S. PATENT DOCUMENTS

| | | | | |
|---|---|---|---|---|
| 6,358,901 B1 * | 3/2002 | Joye | ....................... | C09D 9/005 134/38 |
| 6,656,896 B2 * | 12/2003 | Lallier | ................... | C09D 9/005 134/38 |
| 2005/0048368 A1 * | 3/2005 | Jung | ................... | H01M 10/052 429/217 |

FOREIGN PATENT DOCUMENTS

| | | |
|---|---|---|
| CN | 1277236 A | 12/2000 |
| CN | 1591939 A | 3/2005 |
| CN | 101422708 A | 5/2009 |
| KR | 20030047038 A | 6/2003 |
| WO | 00/45776 A1 | 8/2000 |
| WO | 02/073720 A2 | 9/2002 |
| WO | WO-02/073720 A2 * | 9/2002 |
| WO | WO-2010/084159 A1 * | 7/2010 |
| WO | WO-2012/079231 A1 * | 6/2012 |

OTHER PUBLICATIONS

Chen, Z., E et al.—"Mechanical and Electrical Properties of Poly(vinylidene fluoride-tetrafluoroethylene-propylene)/Super-S Carbon Black Swelled in Liquid Solvent as an Electrode Binder for Lithium-Ion Batteries" (2004) Journal of Applied Polymer Science, vol. 91(5), pp. 2958-2965 (8 pages).*

International Search Report issued on Mar. 12, 2012, by the Chinese Patent Office as the International Searching Authority in International Patent Application No. PCT/CN2011/083958.

* cited by examiner

*Primary Examiner* — Peter D Mulcahy
*Assistant Examiner* — Henry Hu
(74) *Attorney, Agent, or Firm* — Osha Liang LLP

(57) ABSTRACT

A composition for solubilizing a fluoropolymer is described. Further described, is how the fluoropolymer composition is obtained, as well as the process for its preparation and its use as a coating applicant. The composition can include a solubilized fluoropolymer and a solvent blend of a diester and dimethylsulfoxyde.

29 Claims, No Drawings

United States Patent US 9,444,084 B2

FLUOROPOLYMER COMPOSITIONS

CROSS-REFERENCE TO PRIOR APPLICATIONS

This application is a National Stage of PCT/CN2011/083958, filed Dec. 14, 2011, and designating the United States (published in English on Jun. 21, 2012, as WO 2012/079506A1), which claims priority under 35 U.S.C. §119 to PCT/CN2010/079830, filed Dec. 15, 2010, each hereby expressly incorporated by reference in its entirety and each assigned to the assignee hereof.

FIELD OF THE INVENTION

The present invention relates to a composition for solubilizing a fluoropolymer.

The invention also relates to the obtained fluoropolymer composition, the process for its preparation and its uses.

The invention is also of use the fluoropolymer composition for coating applications.

BACKGROUND OF THE INVENTION

Fluoropolymers such as polytetrafluoroethylene, polyvinylidene fluoride are encountered in numerous technical fields.

Polytetrafluoroethylene (PTFE), a synthetic fluoropolymer of tetrafluoro-ethylene is used as a non-stick coating for pans and other cookware; as an insulator in cables and connector assemblies and as a material for printed circuit boards used at microwave frequencies. It is often used in containers and pipework for reactive and corrosive chemicals.

Polyvinylidene fluoride (PVDF) is available as piping products, sheet, tubing, films, plate, membranes, powder coatings, foams and wiring insulator.

It can be injected, molded or welded and is commonly used in the chemical, semiconductor, photovoltaic panels, as well as in lithium ion batteries.

A step in which the fluoropolymer is solubilized is sometimes present in the different applications, particularly when the fluoropolymer is used in batteries.

With the increasing demand for battery-powered electronic equipment, there exists a corresponding increase in demand for rechargeable electrochemical cells having high specific energies.

Lithium-ion secondary batteries have high voltage and high capacity compared to conventional nickel cadmium secondary batteries. In particular, when lithium transition metal composite oxides such as $LiCoO_2$ and $LiMn_2O_4$ are used as cathode active material and carbonaceous materials such as graphite and carbon fiber are used as anode active materials, high voltage and high capacity can be achieved, and side effects such as short circuits do not occur. Thus, lithium secondary batteries are widely used as power sources for mobile electronic devices such as cellular phones, notebook computers, digital cameras, etc.

Lithium secondary batteries are generally prepared by applying on a metal film a slurry consisting of an active material and a polymeric binder, drying the slurry and pressing the film. Although various resins have been used as binder, fluorine-based resins such as polyvinylidene fluoride (PVDF), which adheres well to the material current collector and active material, is commonly used.

To prepare the slurry, the polymeric binder is usually dissolved in a solvent to form a solution having from about 1 to 15% binder in solvent. Binder solutions are typically formulated with N-methylpyrrolidone (NMP). NMP is considered to be most effective.

However, the safety risks for the operators and the environment are a permanent concern. NMP will be labeled as Mutagen Cat 2/Reprotoxic R61 from June 2009 in Europe and NMP is subject to report in the Toxic Release Inventory (SARA title III section 313). There is a need for other solvents, presenting a good safety and/or environment profile.

In CN1277236-A and CN1120210-C, an adhesive formula is developed which consists of polyvinylidene fluoride resin 3-15 wt %, N-methylpyrrolidone or dimethyl acetamide 85-95 wt %, and γ-aminopropyl triethoxy silicone, γ-propyl methacrylate trimethoxy silicone or ethylamino amidopropyl trimethoxy silicone as coupling agent 1-5 wt %.

US2005048368-A1, JP2005072009-A, CN1591939-A, KR2005023179-A and CN100411232-C relate to a separator formula; the employed organic solvent is consisting of dimethylformamide, dimethylsulfoxide, dimethylacetate, acetone, and/or N-methyl-2-pyrrolidine.

Dimethylacetamide, dimethylformamide are also classified as CMR (carcinogen/mutagen/reprotoxic).

KR2003047038-A develop composite binder for lithium battery. The composite electrode binder comprises polyvinylidene fluoride (PVDF) and polyimide. Preferably the polyimide is 20% polyimide solution prepared by mixing pyromellitic dianhydride and 4,4'-diaminophenyl ether in the ratio of 1/1 and dissolving the mixture in N-methylpyrrolidone.

JP2002246029-A, WO200273720-A2, AU2002257642-A1 and AU2002257642-A8 describe a new binder composition comprising fluoro-resin-A which dissolves in a specific organic solvent and resin-B which totally or partially does not dissolve in the organic solvent. Fluoro-resin-A comprises fluoro-polymer-A1 whose 8 wt. % N-methylpyrrolidinone solution has a viscosity of 0.3-20 Pa·s and fluoro-polymer-A2 in which polar groups are incorporated. The weight ratio of A/B is 99/1 to 1/99.

Poly(vinylidene fluoride-hexafluoropropylene)-based membranes for lithium batteries are disclosed in *Journal of Membrane Science* (2008), 310(1+2), 349-355. Poly(vinylidene fluoride-hexafluoropropylene) (PVdF-HFP) copolymer membranes are prepared by phase inversion with poly(ethylene glycol) as additive and with THF, acetone or DMF as solvents.

Mechanical and electrical properties of poly(vinylidene fluoride-tetrafluoroethylene-propylene)/Super-S carbon black swelled in liquid solvent as an electrode binder for lithium-ion batteries are disclosed in *Journal of Applied Polymer Science* (2004), 91(5), 2958-2965.

In the different applications, there is a need for finding solvents with a better health, safety and environment profile in order to prepare solutions of fluoropolymers.

BRIEF SUMMARY OF THE INVENTION

This aim and others are achieved by means of the present invention, the subject of which is therefore a composition for solubilizing a fluoropolymer comprising a solvent blend of:

a diester of formula (I):

wherein

R¹ and R², identical or different, are $C_1$-$C_{20}$ alkyl, aryl, alkyaryl, or arylalkyl groups, linear or branched, cyclic or non cyclic, and A is a linear or branched divalent alkylene group, and DiMethylSulfoxide (DMSO).

The composition may also comprise odor a mask agents, such as compounds containing ester, aldehyde, alcohol, hydrocarbon and/or ketone.

The composition may also comprise an anti-freezing agent, notably a glycol anti-freezing agent, such as for example ethylene glycol or propylene glycol.

Another subject of the invention is also the obtained composition comprising a solubilized fluoropolymer and the solvent blend of a diester of formula (I) and dimethylsulfoxyde, and possibly odor mask and/or anti-freezing agent.

The term "fluoropolymer composition" will be used in the present invention to define this obtained composition.

The fluoropolymer composition obtained according to the invention can be under a solution form or a gel form.

"A gel" is a solid composed of at least two components, one of which (polymer) forms a three-dimensional network in the medium of the other component (solvents), wherein the minimum amount of the liquid is sufficient for ensuring the elastic properties of the gel. A general feature of physical gels is the existence of the yield point.

Thus, the present invention proposes a solvent blend for preparing a solution and/or a gel of a fluoropolymer.

In the context of the invention, the term "solution" is intended to embrace "gel".

The solvent blend used in the invention presents a good HSE profile with no CMR chemicals. Therefore, risks to human health and environment are sharply decreased.

The present invention makes possible the solubilization of a fluoropolymer with solvents which are not labeled CMR.

The solvent blend has a good solvency power for the fluoropolymer.

The solvent blend has a freezing point lower than the one of DMSO and very convenient for the applications. It is very advantageous because the freezing point of DMSO is high (18° C.) close to room temperature which can involve freezing.

The invention also concerns the composition comprising the solubilized fluoropolymer and the process for its preparation.

The invention also concerns the use of this composition in order to prepare a membrane or a coating on any substrate and particularly as a binder polymer for coating a battery separator material.

DETAILED DESCRIPTION OF THE INVENTION

A subject of the present invention is a composition for solubilizing a fluoropolymer comprising a solvent blend of:

a diester of formula (I):

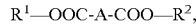

wherein

R¹ and R², identical or different, are $C_1$-$C_{20}$ alkyl, aryl, alkyaryl, or arylalkyl groups, linear or branched, cyclic or non cyclic, and A is a linear or branched divalent alkylene group, and DiMethylSulfoxide (DMSO).

Another subject of the present invention is a fluoropolymer composition comprising a solubilized fluoropolymer and the solvent blend of a diester of formula (I) and dimethylsulfoxyde.

The composition comprises typically from 1 to 15% by weight of the fluoropolymer.

The composition has generally a viscosity of lower than 1000 cP at room temperature, preferably at 27° C.

When the fluoropolymer is PVDF, the obtained solutions of PVDF in the solvent blend of the invention, have preferably a viscosity in the range of 250 to 400 cP, more preferably 300 to 400 cP at room temperature.

Fluoropolymer

The polymer involved in the composition of the invention is a fluoropolymer.

Regarding the fluoropolymer, this denotes any polymer having in its chain more than 50%, preferably more than 75%, by weight of at least one fluoromonomer chosen from the monomers containing a vinyl bond capable of opening in order to be polymerized and that contains, directly attached to this double bond, at least one fluorine atom, one fluoroalkyl group or one fluoroalkoxy group.

The fluoropolymer may be a homopolymer or a copolymer at least partly derived from olefinic monomers completely substituted by fluorine atoms or completely substituted by a combination of fluorine atoms and of at least one of chlorine, bromine and iodine atoms per monomer.

Examples of fluoro homo- or copolymers are polymers or copolymers derived from tetrafluoroethylene, hexafluoropropylene, chlorotrifluoroethylene and bromotrifluoroethylene.

Such fluoropolymers may also contain recurring units derived from other ethylenically unsaturated monomers containing at least as many fluorine atoms as carbon atoms, such as, for example, vinylidene fluoride, trifluoroethylene and vinyl perfluoroalkyl ethers such as perfluoro(methylvinyl) ether or perfluoro(ethylvinyl)ether.

Polyvinylidenefluoride (PDVF) polymers (homopolymer or copolymers thereof) are especially preferred.

The fluoropolymer can be a copolymer of vinylidene fluoride (VDF) with comonomers such as hexafluoropropylene (HFP) and/or chlorotrifluoroethylene (CTFE). The comonomer is advantageously HFP.

The PVDF contains, by weight, at least 50% of VDF, more preferentially at least 75% and even more preferentially at least 85%.

The amount of comonomer can be typically of from 0-25%, preferably 0-10% by weight.

Examples of such appropriate PVDF polymers include Kynar 301F, Kynar 741 and Kynar 461, available from Arkema and Solef 6020, available from Solvay.

The fluoropolymer may be a homopolymer or a copolymer, it may also comprise unfluorinated monomers such as ethylene or propylene in quantities preferably less than 25%.

The present invention includes the case where the fluoropolymer is mixed with minor quantities (less than 50 wt %) of another polymer such as polyurethane, polyethylene oxide, polyacrylonitrile, polymethylacrylate, polyacrylamide, polyvinylacetate, polyvinylpyrrolidone, glycol diacrylate and combinations thereof.

Solvent

The solvent blend used in the invention comprises at least two solvents: the diester and DSMO.

The weight ratio between the diester and DMSO is preferably of from 1/99 to 99/1, preferably of from 20/80 to 80/20, preferably of from 70/30 to 30/70. These ratios allow good properties as well a good HSE profile.

The solvent blend can comprise further solvents than the diester and DMSO.

In case odor mask in included, the weight ratio between the diester/DMSO blend and the odor mask is preferable of from 0.1/99.9 to 1/99. These ratio allow good properties as well a good HSE profile.

In case anti-freezing agent is included, the weight ratio between the diester/DMSO blend and the anti-freezing agent is preferable of from 1/99 to 10/90. These ratio allow good properties as well a good HSE profile.

Examples of further solvents include:
aliphatic hydrocarbons including, more particularly, the paraffins such as, in particular, pentane, hexane, heptane, octane, nonane, decane, undecane, dodecane or cyclohexane, and naphthalene and aromatic hydrocarbons and more particularly aromatic hydrocarbons such as, in particular, benzene, toluene, xylenes, cumene, petroleum fractions composed of a mixture of alkylbenzenes,
aliphatic or aromatic halogenated hydrocarbons including more particularly, perchlorinated hydrocarbons such as, in particular, tetrachloroethylene, hexachloroethane; partially chlorinated hydrocarbons such as dichloromethane, chloroform, 1,2-dichloroethane, 1,1,1-trichloroethane, 1,1,2,2-tetrachloroethane, pentachloroethane, trichloroethylene, 1-chlorobutane, 1,2-dichlorobutane; monochlorobenzene, 1,2-dichlorobenzene, 1,3-dichlorobenzene, 1,4-dichlorobenzene, 1,2,4-trichlorobenzene or mixture of different chlorobenzenes,
aliphatic, cycloaliphatic or aromatic ether oxides, more particularly, diethyl oxide, dipropyl oxide, diisopropyl oxide, dibutyl oxide, methyltertiobutylether, dipentyl oxide, diisopentyl oxide, ethylene glycol dimethyl ether, ethylene glycol diethyl ether, ethylene glycol dibutyl ether benzyl oxide; dioxane, tetrahydrofuran (THF),
glycol ethers such as ethylene glycol monomethyl ether, ethylene glycol monoethyl ether, ethylene glycol monopropyl ether, ethylene glycol monoisopropyl ether, ethylene glycol monobutyl ether, ethylene glycol monophenyl ether, ethylene glycol monobenzyl ether, diethylene glycol monomethyl ether, diethylene glycol monoethyl ether, diethylene glycol mono-n-butyl ether,
glycol ether esters such as ethylene glycol methyl ether acetate, ethylene glycol monoethyl ether acetate, ethylene glycol monobutyl ether acetate,
alcohols such as methyl alcohol, ethyl alcohol, diacetone alcohol,
ketones such as acetone, methylethylketone, methylisobutyl ketone, diisobutylketone, cyclohexanone, isophorone,
linear or cyclic esters such as: isopropyl acetate, n-butyl acetate, methyl acetoacetate, dimethyl phthalate, γ-butyrolactone,
linear or cyclic carboxamides such as N,N-dimethylacetamide (DMAC), N,N-diethylacetamide, dimethylformamide (DMF), diethylformamide or N-methyl-2-pyrrolidinone (NMP),
organic carbonates for example dimethyl carbonate, diethyl carbonate, dipropyl carbonate, dibutyl carbonate, ethylmethyl carbonate, ethylene carbonate, vinylene carbonate,
phosphoric esters such as trimethyl phosphate, triethyl phosphate,
ureas such as tetramethylurea, tetraethylurea.

The amount of further solvents is preferably or lower than the amount of the diester and/or of DMSO. The amount of further solvent is preferably of lower then 50% by weight, preferably of lower than 25% of the total amount of solvents.

In one embodiment of the invention, a low amount of further solvents is preferred.

In one embodiment of the invention, the solvent is chosen CMR free and substantially free of NMP, DMF, DMAC.

In one embodiment of the invention, the solvent is substantially free to further solvents.

Diester

The diester involved in the composition of the invention corresponds to formula (I).

In the context of the invention, "alkyl" is understood to mean: a linear or branched hydrocarbon chain having from 1 to 20 carbon atoms and preferably from 1 or 2 to 10 carbon atoms: or a cyclic hydrocarbon group comprising from 3 to 8 carbon atoms, preferably a cyclopentyl or cyclohexyl group.

"Aryl" is understood to mean an aromatic mono- or polycyclic group, preferably a mono- or bicyclic group, comprising from 6 to 12 carbon atoms, preferably phenyl or naphthyl.

"Arylalkyl" is understood to mean a linear or branched hydrocarbon group carrying an aromatic monocyclic ring and comprising from 7 to 12 carbon atoms, preferably benzyl.

"Alkylaryl" is understood to mean an aromatic monocyclic group carrying an alkyl group.

The diester can be a mixture of different diesters of formula (I). This can allows improved drying properties.

In formula (I) $R^1$ and $R^2$, identical or different are preferably selected from the group consisting of methyl, ethyl, n-propyl, isopropyl, n-butyl, isobutyl, n-hexyl, isooctyl, 2-ethylhexyl, cyclohexyl, phenyl and benzyl.

According to one embodiment of the invention, A is $C_3$-$C_{10}$ branched divalent alkylene. For example, A can be selected from the groups consisting of the following:

$A_{MG}$ of formula —CH($CH_3$)—$CH_2$—$CH_2$—,
$A_{ES}$ of formula —CH($C_2H_5$)—$CH_2$—, and
their mixtures.

In one embodiment the diester is:
$CH_3$—OOC—CH($CH_3$)—$CH_2$—$CH_2$—COO—$CH_3$, or is a mixture of diesters comprising such a compound.

In one embodiment the diester is a mixture comprising diesters of the following formula (I'), (I") optionally (II):

$$R^1\text{—OOC-}A_{MG}\text{-COO—}R^2 \qquad (I')$$

$$\text{—}R^1\text{—OOC-}A_{ES}\text{-COO—}R^2 \qquad (I''),$$

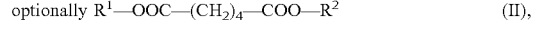

$$\text{optionally } R^1\text{—OOC—}(CH_2)_4\text{—COO—}R^2 \qquad (II),$$

wherein:
$A_{MG}$ is —CH($CH_3$)—$CH_2$—$CH_2$—,
$A_{ES}$ is —CH($C_2H_5$)—$CH_2$—.

In this embodiment $R^1$ and $R^2$ are preferably methyl groups.

The mixture of diesters can comprise:
from 70 to 95% by weight of diester of formula (I')
from 5 to 30% by weight of diester of formula (I"), and
from 0 to 10% by weight of diester of formula (II).

An example of the useful diester-based solvent wherein A is branched is Rhodiasolv® IRIS, marketed by Rhodia.

Rhodiasolv® IRIS is a mixture of diesters comprising essentially (more than 80 wt %) of dimethyl ethylsuccinate and dimethyl 2-methylgiutarate.

In one embodiment, A is a divalent alkylene group of formula $(CH_2)_r$, wherein r is an average number of from 2 to 4.

For example, the diester is a mixture of dimethyladipate (r=4), dimethylglutarate (r=3) and dimethylsuccinate (r=2), or a mixture of diethyladipate (r=4), diethylglutarate (r=3) and diethylsuccinate (r=2), or a mixture of diisobutyladipate (r=4), diisobutylglutarate (r=3) and diisobutylsuccinate (r=2).

For example the diester is a mixture comprising:
from 9 to 17% by weight of dimethyladipate,
from 59 to 67% by weight of dimethylglutarate, and
from 20 to 28% by weight of dimethylsuccinate.

An example of the useful diester-based solvent wherein A is linear is Rhodiasolv® RPDE, marketed by Rhodia.

Rhodiasolv® RPDE is a mixture of diesters comprising essentially (more than 70 wt %) of dimethylglutarate and dimethylsuccinate.

The diester which is used in the composition of the invention, can be prepared according to EP1991519.

A mixture of Rhodiasolv® IRIS and DMSO (50/50 wt) is very interesting because its freezing point is below 5° C. compared to the one of DMSO equal to 18° C.

A mixture of Rhodiasolv® IRIS and DMSO and ethylene glycol (48.75/48.75/2.5 wt) is very interesting because its freezing point is −12° C. compared to the one of Rhodiasolv® IRIS and DMSO equal to 5° C.

A mixture of Rhodiasolv® IRIS and DMSO and propylene glycol (48.75/48.75/2.5 wt) is very interesting because its freezing point is −10.9° C. compared to the one of Rhodiasolv® IRIS and DMSO equal to 5° C.

According to another embodiment, the diester of formula (I) is a dialkylsuccinate, preferably dimethylsuccinate which can be prepared according to a chemical or biochemical process.

Solvent Blend

The invention also concerns a mixture of solvents that is particularly useful for carrying out the invention.

This mixture (or blend) comprises DMSO and a diester of formula (I), wherein the diester is a diester of formula (I) wherein A is a branched divalent alkylene group, preferably a $C_3$-$C_{10}$ branched divalent alkylene group. Such groups and diesters therewith are described above.

The weight ratio between the diester and DMSO in the mixture (or blend) is of from 1/99 to 99/1, preferably of from 20/80 to 80/20, preferably of from 70/30 to 30/70.

The solvent can comprise further solvents than the diester and DMSO which are above described. The amount of further solvents is preferably or lower than the amount of the diester and/or of DMSO. The amount of further solvent is preferably of lower then 50% by weight, preferably of lower than 25% of the total amount of solvents.

Odor mask can be included in the blend, the weight ratio between the diester/DMSO blend and the odor mask is preferable of from 0.1/99.9 to 1/99.

Anti-freezing agent can be included, the weight ratio between the diester/DMSO blend and the anti-freezing agent is preferable of from 1/99 to 10/90.

Process for Preparing the Fluoropolymer Composition

Another object of the invention is the process for the preparation of the composition comprising the fluoropolymer which is called "fluoropolymer composition".

The composition of the invention is prepared according a process comprising the steps of:
preparing the solvent blend by mixing a diester of formula (I) and dimethylsulfoxyde,
introducing the solvent blend into the fluoropolymer, under stirring,
heating the mixture at a temperature from room temperature to a temperature equal to or below 100° C.

The term "room temperature" generally means a temperature in the range 15° C. to 30° C.

This operation is advantageously carried out from 30 to 80° C.

The temperature is maintained until solubilization of the fluoropolymer.

At the end of this step, the obtained composition is generally cooled down to room temperature.

According to another embodiment of the invention, the process for the preparation of the fluoropolymer composition comprises the steps of:
preparing the solvent blend by mixing a diester of formula (I) and dimethylsulfoxyde,
heating the solvent blend at a temperature from room temperature to a temperature equal to or below 100° C., preferably from 30 to 80° C.,
introducing the fluoropolymer into the solvent blend.

The temperature is maintained until solubilization of the fluoropolymer.

At the end of this step, the obtained composition is generally cooled down to room temperature.

Uses

The solvent blend of the present invention can be used every time a solvent route is preferred for the use of a fluoropolymer material, preferably PVDF.

Another application of the solvent blend of the invention, is in the field of recycling fluoropolymers, particularly PVDF. Thus, PVDF can be recovered from the backing of the photovoltaic panels and from wire coatings.

The fluoropolymer composition obtained from the solvent blend of the invention can be used for example, as a raw material for preparing a membrane or a foam or for coating a substrate.

Examples of substrates which can be coated are metal (sheet, film, and wire), plastics, textiles, glass and so on.

The present invention also provides a process for coating a substrate comprising the steps of applying the fluoropolymer composition of the invention onto one or two sides of the substrate or parts thereof and removing the solvent.

The solvent removal can be obtained for example by evaporation by increasing the temperature or by phase inversion technique using an additional non-solvent, for example water.

One specific application is a process for preparing a coated battery separator.

The separator material may be composed of a porous polyolefin, preferably polyethylene, polypropylene, or a combination of the two, coated as described below.

Other possible separator materials include polytetrafluoroethylene, polystryrene, polyethyleneterephtalate, ethylenepropylene diene monomer (EPDM), nylon and combinations thereof.

The process of the invention for preparing a coated battery separator, comprises the steps:
providing a separator material,
applying the fluoropolymer composition of the invention onto one or two sides of the separator or parts thereof,
removing the solvent.

The fluoropolymer composition may be applied to one side of the separator material at a time or, in another embodiment, both sides simultaneously.

One side of the separator material may be coated at a time with the fluoropolymer composition of the present invention. The coated separator is then dried by evaporation of the solvents to form a porous fluoropolymer coating on one side of the separator material. After coating the first side, the same process is used again to coat the second side of the separator.

In a preferred embodiment, the separator may be coated on both sides simultaneously by running the separator material through a dipping bath of the fluoropolymer composition. The coated separator material is then dried by evaporation.

After drying, a porous coating of fluoropolymer on the separator is obtained.

The present invention also provides a process for preparing a battery involving the separator coated according to the invention.

Electrochemical cells particularly lithium batteries in accordance with the present invention may be manufactured using the porous coated separator together with other electrochemical cell components.

The three primary functional components of a lithium-ion battery are the anode, cathode, and electrolyte.

The anode of a conventional lithium-ion cell is made from carbon (graphite).

The cathode is a metal oxide (for example cobalt or manganese dioxide).

The electrolyte is typically a mixture of organic solvents containing complexes of lithium ions.

Sample liquid electrolyte compositions for lithium ion cells in accordance with the present invention may include solvents such as propylene carbonate, ethylene carbonate, diethyl carbonate, dimethyl carbonate, ethyl methyl carbonate, dipropyl carbonate, dimethyl sulfoxide, acetonitrile and combinations thereof, a lithium salt having Li as the cation and one of $PF_6^-$, $AsF_6^-$, $BF_4^-$, $ClO_4^-$, $CF_3SO_3^-$, $N(CF_3SO_2)_2^-$ as the anion.

Briefly, the present invention provides an electrochemical cell fabrication process wherein a fluoropolymer is applied to a porous battery separator material.

Fluoropolymer compositions in accordance with the present invention are formulated with high boiling point solvents which have good HSE profiles to dissolve the fluoropolymer and coat it on the separator.

Examples of implementation of the invention are given hereinafter. These examples are given by way of indication and are not limiting in nature.

EXAMPLES

In the example the letter C stands for a comparative example

Example 1

Solutions of a Fluoropolymer

Example 1.1

10.0% in weight of PVDF (Kynar® 461, Arkema) was mixed with 42.3% of dimethylsulphoxide (DMSO) and 47.7% of Rhodiasolv® IRIS (Rhodia).

The solution was mixed and heated up until the temperature reached about 45~50° C.

The solution became transparent.

The solution was then cooled down to room temperature. No gelling was observed.

Example 1.2C 9.1% in weight of PVDF (Kynar® 461, Arkema) was mixed with 90.9% of DMSO.

The solution was mixed and PVDF resin has been swelled at room temperature, and then heated up until the temperature reached about 51.8° C.

The solution became transparent.

Example 1.3

9.1% in weight of PVDF (Kynar® 461, Arkema) was mixed with 48.2% IRIS and 42.7% of DMSO.

The solution was mixed and PVDF resin has been swelled at 32.3° C., and then heated up until the temperature reached about 45.0° C.

The solution became transparent. No gelling was observed.

Example 1.4C 9.1% in weight of PVDF (Kynar® 461, Arkema) was mixed with 90.9% of Rhodiasolv® RPDE (Rhodia).

The solution was mixed and heated up until the temperature reached about 80° C.

The solution became transparent.

The solution formed a gel when cooled down to room temperature.

Example 1.5C 9.1% in weight of PVDF (Kynar® 461, Arkema) was mixed with 90.9% of Rhodiasolv® IRIS (Rhodia).

The solution was mixed and heated up until the temperature reached about 68.5° C.

The solution became transparent. The solution formed a gel when cooled down to room temperature.

Example 2

A series of compositions comprising PVDF are prepared, at different temperatures.

Example 2.1

8 g of PVDF marketed by FLTCO (Sinochem) was mixed with 80 g of a mixture of Rhodiasolv® IRIS and DMSO (50/50 wt).

The solution was mixed and heated up until the temperature reached about 40° C.

The solution became transparent in two hours. No gelling was observed when cooled down to room temperature.

Example 2.2

8 g of PVDF marketed by FLTCO (Sinochem) was mixed with 80 g of a mixture of Rhodiasolv® IRIS and DMSO (50/50 wt).

The solution was mixed and heated up until the temperature reached about 50° C.

The solution became transparent in 30 minutes. No gelling was observed when cooled down to room temperature.

Example 2.3

8 g of PVDF marketed by FLTCO (Sinochem) was mixed with 80 g of a mixture of Rhodiasolv® IRIS and DMSO (50/50 wt).

The solution was mixed and heated up until the temperature reached about 60° C.

The solution became transparent in 15 minutes. No gelling was observed when cooled down to room temperature.

Example 2.4

8 g of PVDF marketed by FLTCO (Sinochem) was mixed with 80 g of a mixture of Rhodiasolv® IRIS and DMSO (50/50 wt).

The solution was mixed and heated up until the temperature reached about 70° C.

The solution became transparent in less than 15 minutes. No gelling was observed when cooled down to room temperature.

Example 2.5

8 g of PVDF marketed by FLTCO (Sinochem) was mixed with 80 g of a mixture of Rhodiasolv® IRIS and DMSO (50/50 wt).

The solution was mixed and heated up until the temperature reached about 80° C.

The solution became transparent in few minutes. No gelling was observed when cooled down to room temperature.

Example 3

A series of compositions comprising PVDF are prepared, by dissolving in blend of Rhodiasolv® IRIS, DMSO, odor mask and anti-freezing agent.

Example 3.1

3 g of PVDF marketed by FLTCO (Sinochem) was mixed with 30 g of a mixture of Rhodiasolv® IRIS and DMSO and odor mask and ethylene glycol (48.6/48.6/0.3/2.5 wt).

The solution was mixed and heated up until the temperature reached about 60° C.

The solution became transparent in 15 minutes. No gelling was observed when cooled down to room temperature.

Example 3.2

3 g of PVDF marketed by FLTCO (Sinochem) was mixed with 30 g of a mixture of Rhodiasolv® IRIS and DMSO and odor mask and propylene glycol (48.6/48.6/0.3/2.5 wt).

The solution was mixed and heated up until the temperature reached about 60° C.

The solution became transparent in 15 minutes. No gelling was observed when cooled down to room temperature.

Elevated Temperature Test

The PVDF marketed by FLTCO (Sinochem) and the solvent were mixed together and stirred while heating. Heating temperature was set from 50° C. to 80° C.

The dissolving status was observed. Heating was stopped when the mixture becomes transparent. The viscosity was measured at room temperature (rt) after cooling down.

Elevated Temperature Test

| Solvents | Transparent Point (° C.) | Viscosity rt (cP) | Remarks |
| --- | --- | --- | --- |
| NMP | Room temperature | 355 | A gold to brown colored solution is formed |
| DMSO | 51.8 | 656.4 | |
| IRIS | 100 | — | Gelated after cooled to room temperature. |
| RPDE | 100 | — | Gelated after cooled to room temperature |
| IRIS + DMSO | 50 | 320-340 | A colorless and transparent solution is formed. Start gelating 2 days later at room temperature. But gelating disappears when heated back to 60° C. |
| IRIS + DMSO | 60 | 350-375 | A colorless and transparent solution is formed. Start gelating 6 days later at room temperature. But gelating disappears when heated back to 60° C. |
| IRIS + DMSO | 70 | 315-330 | A colorless and transparent solution is formed. No gelating 7 days later at room temperature. But gelating disappears when heated back to 60° C. |
| IRIS + DMSO | 80 | 380-400 | A colorless and transparent solution is formed. No gelating 7 days later at room temperature. But gelating disappears when heated back to 60° C. |
| IRIS + DMSO + odor mask + ethylene glycol | 60 | 380-400 | A colorless and transparent solution is formed. No gelating 7 days later at room temperature. But gelating disappears when heated back to 60° C. |
| IRIS + DMSO + odor mask + propylene glycol | 60 | 380-400 | A colorless and transparent solution is formed. No gelating 7 days later at room temperature. But gelating disappears when heated back to 60° C. |

The viscosity was measured at room temperature (27° C.) with a BROOKFIELD MODEL DV-II+ viscometer: its speed was set to 50 rpm for all the tests.

This shows that there is a synergy between the diester and DMSO to obtain the dissolution (transparence): the mixture requires less heating and less dissolution time than the individual components. Moreover, this is the only diesters do not allow an easy use as there is a gel formation. Comparing to NMP, this blend solvent also achieves faster dissolution.

Example 3

Coating

PVDF solution prepared at 1/10 w/w ratio with the blend of Rhodiasolv® IRIS and DMSO, is capable to form a thin film on flat surface, which could be advantageous to apply in coatings.

Solvent Recovery

The solvent for PVDF dissolution as it is used in battery manufacturing, is for most of the cases reused after recovery.

To maximize the cost effectiveness of this solvent, solvent is recovered and recycled.

The composition of solvent blend would not be shifted during the recovery process, and the solvent blend obtained is directly re-usable.

The results are given in the following table and compared to those obtained with the NMP:

| Solvent blend | Rhodiasolv ® IRIS + DMSO blend | NMP |
|---|---|---|
| Pression | 15-20 mbar | 13 mbar |
| Temperature | 68-80° C. | 81-82° C. |

What is claimed is:

1. A fluoropolymer composition comprising:
   a solvent blend comprising:
   a diester of formula (I):

$$R^1\text{—OOC-A-COO—}R^2 \qquad (I),$$

wherein $R^1$ and $R^2$, identical or different, are $C_1$-$C_{20}$ alkyl, aryl, alkylaryl, or arylalkyl groups, linear or branched, cyclic or non cyclic, and
   A is a linear or branched divalent alkylene group, and dimethylsulfoxide (DMSO); and
   a fluoropolymer solubilized in the solvent blend.

2. The composition as defined by claim 1, wherein $R^1$ and $R^2$, identical or different are selected from the group consisting of methyl, ethyl, n-propyl, isopropyl, n-butyl, isobutyl, n-hexyl, isooctyl, 2-ethylhexyl, cyclohexyl, phenyl and benzyl.

3. The composition as defined by claim 1, wherein the diester is a mixture of different diesters of formula (I).

4. The composition as defined by claim 1, wherein A is $C_3$-$C_{10}$ branched divalent alkylene.

5. The composition as defined by claim 1, wherein A is selected from the group consisting of the following:
   $A_{MG}$ of formula —CH(CH$_3$)—CH$_2$—CH$_2$—,
   $A_{ES}$ of formula —CH(C$_2$H$_5$)—CH$_2$—, and their mixtures.

6. The composition as defined by claim 1, wherein the diester has the following formula:

$$CH_3\text{—OOC—CH(CH}_3\text{)—CH}_2\text{—CH}_2\text{—COO—CH}_3.$$

7. The composition as defined by claim 1, wherein the diester is a mixture comprising diesters of the following formula (I'), (I") and optionally (II):

$$R^1\text{—OOC-}A_{MG}\text{-COO—}R^2 \qquad (I')$$

$$R^1\text{—OOC-}A_{ES}\text{-COO—}R^2 \qquad (I''), \text{ and}$$

$$\text{optionally } R^1\text{—OOC—(CH}_2)_4\text{—COO—}R^2 \qquad (II),$$

wherein:
   $A_{MG}$ is —CH(CH$_3$)—CH$_2$—CH$_2$—,
   $A_{ES}$ is —CH(C$_2$H$_5$)—CH$_2$—.

8. The composition as defined by claim 7, wherein $R^1$ and $R^2$ are methyl groups.

9. The composition as defined by claim 7, wherein the mixture of diesters comprises:
   from 70% to 95% by weight of diester of formula (I'),
   from 5% to 30% by weight of diester of formula (I"), and
   from 0% to 10% by weight of diester of formula (II).

10. The composition as defined by claim 1, wherein A is a divalent alkylene group of formula (CH$_2$)$_r$, wherein r is an average number of from 2 to 4.

11. The composition as defined by claim 10, wherein the diester is a mixture of dimethyladipate (r=4), dimethylglutarate (r=3) and diméthylsuccinate (r=2), or a mixture of diethyladipate (r=4), diethylglutarate (r=3) and diethylsuccinate (r=2), or a mixture of diisobutyladipate (r=4), diisobutylglutarate (r=3) and diisobutylsuccinate (r=2).

12. The composition as defined by claim 11, wherein the diester is a mixture comprising:
   from 9% to 17% by weight of dimethyladipate,
   from 59% to 67% by weight of dimethylglutarate, and
   from 20% to 28% by weight of dimethylsuccinate.

13. The composition as defined by claim 1, wherein the weight ratio between the diester and DMSO is of from 1/99 to 99/1.

14. The composition as defined by claim 13, wherein the weight ratio between the diester and DMSO is from 20/80 to 80/20.

15. The composition as defined by claim 13, wherein the weight ratio between the diester and DMSO is from 70/30 to 30/70.

16. The composition as defined by claim 1, wherein the diester is dimethylsuccinate.

17. The composition as defined by claim 1, wherein the fluoropolymer is polyvinylidene_fluoride (PDVF) and copolymer of vinylidene fluoride with comonomers hexafluoropropylene (HFP) and/or chlorotrifluoroethylene (CTFE).

18. The composition as defined by claim 1, wherein the amount of fluoropolymer is of from 1% to 15% by weight.

19. The composition as defined by claim 1, wherein the composition comprises an odor masking agent.

20. The composition as defined by claim 1, wherein the composition comprises an anti freezing agent.

21. A process of preparing the composition as defined by claim 1, wherein the process comprises the steps of:
   preparing the solvent blend by mixing a diester of formula (I) and dimethylsulfoxide,
   introducing the solvent blend into the fluoropolymer, under stirring, and
   heating the mixture at a temperature form room temperature to a temperature equal to or below 100° C., thereby solubilizing the fluoropolymer and forming the fluoropolymer composition of claim 1.

22. The process as defined by claim 21, further comprising cooling down the mixture.

23. The process as defined by claim 21, wherein the solvent blend is heated at a temperature from 30° C. to 80° C.

24. A process of preparing the composition as defined by claim 1, wherein the process of preparation comprises the steps of:
   preparing the solvent blend by mixing a diester of formula (I) and dimethylsulfoxide,
   heating the solvent blend at a temperature from room temperature to a temperature equal to or below 100° C., and
   introducing the fluoropolymer into the solvent blend, thereby solubilizing the fluoropolymer and forming the fluoropolymer composition of claim 1.

25. The process as defined by claim 24, wherein the solvents blend is heated to a temperature from 30° C. to 80° C.

26. A method of preparing a membrane, a foam or a substrate coating, the method comprising preparing the membrane foam or coating using the fluoropolymer composition as defined by claim 1 as a raw material for the membrane, foam or coating.

27. A process for coating a substrate, the process comprising applying the fluoropolymer composition as defined by claim 1 onto one or two sides of the substrate or parts thereof and removing the solvent.

28. The process as defined by claim 27, wherein the substrate is a battery separator material.

29. A method of recycling fluoropolymer, the method comprising using the solvent blend as defined by claim 1 in the recovery of PVDF from a backing of a photovoltaic panel or a wire coating, thereby forming the fluoropolymer composition of claim 1.

\* \* \* \* \*